(12) United States Patent
Begin

(10) Patent No.: US 10,701,891 B2
(45) Date of Patent: Jul. 7, 2020

(54) CAT BOX TABLE

(71) Applicant: John Begin, East Bridgewater, ME (US)

(72) Inventor: John Begin, East Bridgewater, ME (US)

( * ) Notice: Subject to any disclaimer, the term of this patent is extended or adjusted under 35 U.S.C. 154(b) by 120 days.

(21) Appl. No.: 16/185,998

(22) Filed: Nov. 9, 2018

(65) Prior Publication Data

US 2019/0141945 A1    May 16, 2019

Related U.S. Application Data

(60) Provisional application No. 62/584,730, filed on Nov. 10, 2017.

(51) Int. Cl.
*A01K 23/00*  (2006.01)
*F16M 11/38*  (2006.01)
*A01K 1/01*   (2006.01)
*A01K 1/035*  (2006.01)

(52) U.S. Cl.
CPC ............ *A01K 1/0107* (2013.01); *A01K 1/035* (2013.01); *F16M 11/38* (2013.01)

(58) Field of Classification Search
CPC ........ A01K 1/0107; A01K 1/01; A01K 1/011; A01K 1/035; A01K 13/00; A01K 29/00; F16M 11/38

See application file for complete search history.

(56) References Cited

U.S. PATENT DOCUMENTS

| 8,104,725 B1 * | 1/2012 | Kebre ................... A01K 1/0107 |
| | | 248/164 |
| 9,681,638 B1 * | 6/2017 | Harris ....................... A01K 1/01 |
| 10,064,383 B1 * | 9/2018 | Valdespee ............ A01K 1/0107 |
| 2016/0375919 A1 * | 12/2016 | Wright ................. A01K 1/0107 |
| | | 119/165 |
| 2018/0199538 A1 * | 7/2018 | Amicarelli ........... A01K 1/0107 |
| 2019/0200567 A1 * | 7/2019 | Amicarelli ............. F16M 11/42 |

* cited by examiner

*Primary Examiner* — Daniel J Colilla
(74) *Attorney, Agent, or Firm* — Bruce A. Lev

(57) ABSTRACT

A cat box table structured and arranged to secure a wide variety of various sized litter boxes thereto, and also comprises folding legs. The cat box table also has components for holding or storing cat accessories. The cat box table also includes steps which will allow a cat to climb from the floor up onto the table.

16 Claims, 4 Drawing Sheets

CAT BOX TABLE

CROSS-REFERENCE TO RELATED APPLICATION

The present application is related to and claims priority from prior provisional application Ser. No. 62/584,730, filed Nov. 10, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of cat litter box devices and more specifically relates to a table structured and arranged to secure a wide variety of various sized litter boxes thereto, and also comprises folding legs. The table also has components for holding or storing cat accessories.

2. Description of the Related Art

A litter box is an indoor feces and urine collection box for cats that are permitted free roam in a home but who cannot or do not always go outside to relieve themselves. Many owners of these animals prefer not to let them roam outside for fear that they might succumb to outdoor dangers, such as weather, wildlife, traffic, or hostile humans. It has been claimed indoor cats, on average, live ten years longer than outdoor cats. A litter box makes it possible to shelter pets from these risks. Unfortunately, cleaning a cat box is something that has to be done a lot if you want to keep it relatively smell free and keep your cats healthy. Even touchless litter boxes and/or new litter still smells due to cats not just having their urine only in the litter, but the urine also gets around the sides of the box or on a cover if the litter box has one thereby creating an unpleasant odor.

Various attempts have been made to solve problems found in cat litter box device art. Among these are found in: U.S. Pub. No. 2005/0120968 to Natalie Dorsey; U.S. Pub. No. 2014/0352622 to Wallace et al.; U.S. Pat. No. 4,683,839 to Richard G. Uhrick; U.S. Pub. No. 2004/0079291 to Henry Romatowski; and U.S. Pub. No. 2006/0272590 to Paul Pettys. This prior art is representative of cat litter box furniture devices.

None of the above inventions and patents, taken either singly or in combination, is seen to describe the invention as claimed. Thus, a need exists for a reliable Cat Box Table, a table structured and arranged to secure a wide variety of various sized litter boxes thereto, and also comprises folding legs. The table also has components for holding or storing cat accessories and to avoid the above-mentioned problems.

BRIEF SUMMARY OF THE INVENTION

In view of the foregoing disadvantages inherent in the known cat litter box device art, the present invention provides a novel Cat Box Table. The general purpose of the present invention, which will be described subsequently in greater detail, is to provide a table structured and arranged to secure a wide variety of various sized litter boxes thereto, and which also comprises folding legs. The table also has components for holding or storing cat accessories. The features of the invention which are believed to be novel are particularly pointed out and distinctly claimed in the concluding portion of the specification. These and other features, aspects, and advantages of the present invention will become better understood with reference to the following drawings and detailed description.

The present invention holds significant improvements and serves as a novel Cat Box Table. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a Cat Box Table, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a Cat Box Table as used to improve the care and hygiene of a feline pet.

Figure 1:
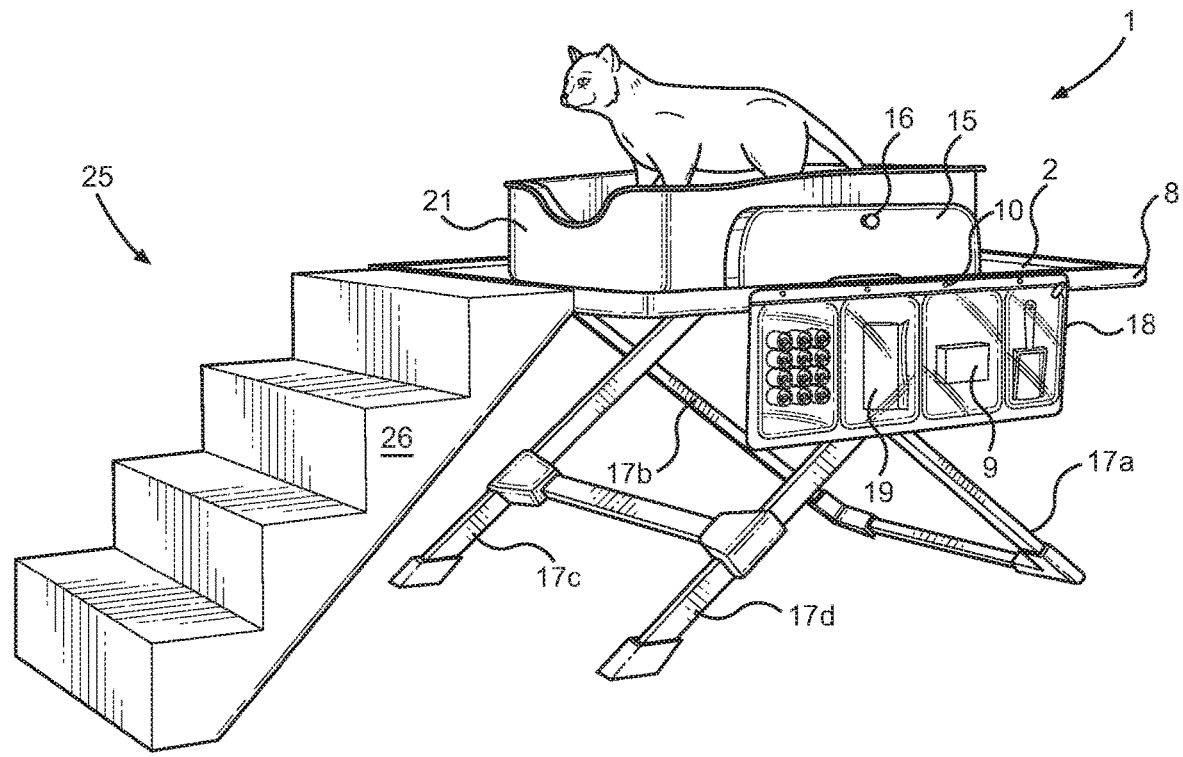
FIG. 1 shows a perspective view illustrating a Cat Box Table according to an embodiment of the present invention.
Figure 2:
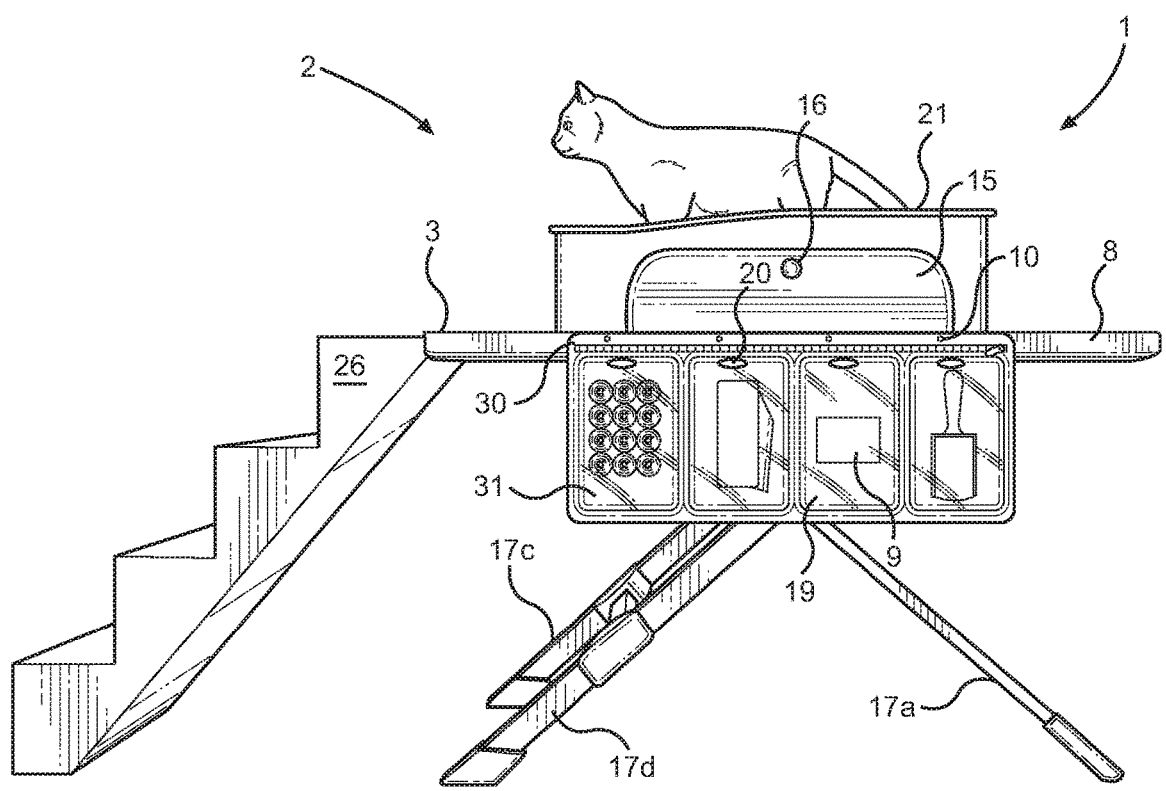
FIG. 2 is a perspective view illustrating a side view of the Cat Box Table according to an embodiment of the present invention of FIG. 1.
Figure 3:
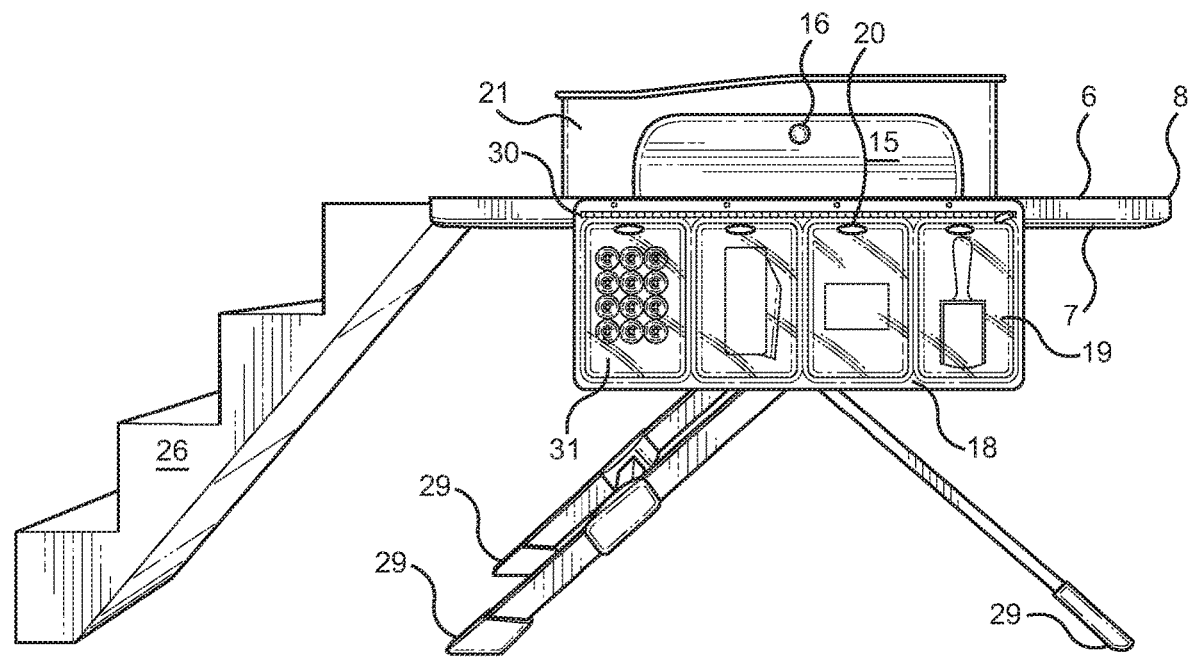
FIG. 3 is a side view illustrating the Cat Box Table according to an embodiment of the present invention of FIG. 1.
Figure 4:
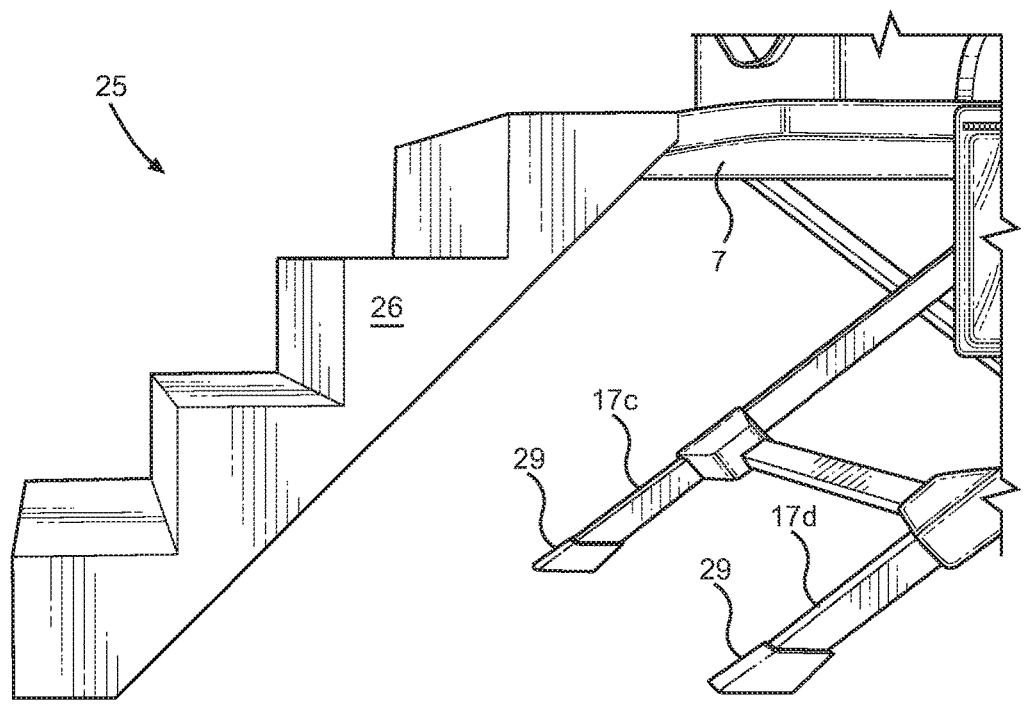
FIG. 4 is a side view illustrating the steps of the Cat Box Table according to an embodiment of the present invention of FIG. 1.
Figure 6:
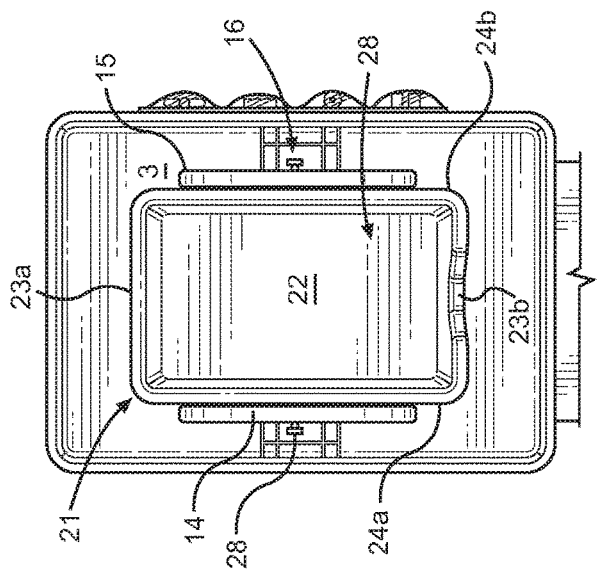
FIG. 6 is another top view illustrating the Cat Box Table according to an embodiment of the present invention of FIG. 1.
Figure 5:
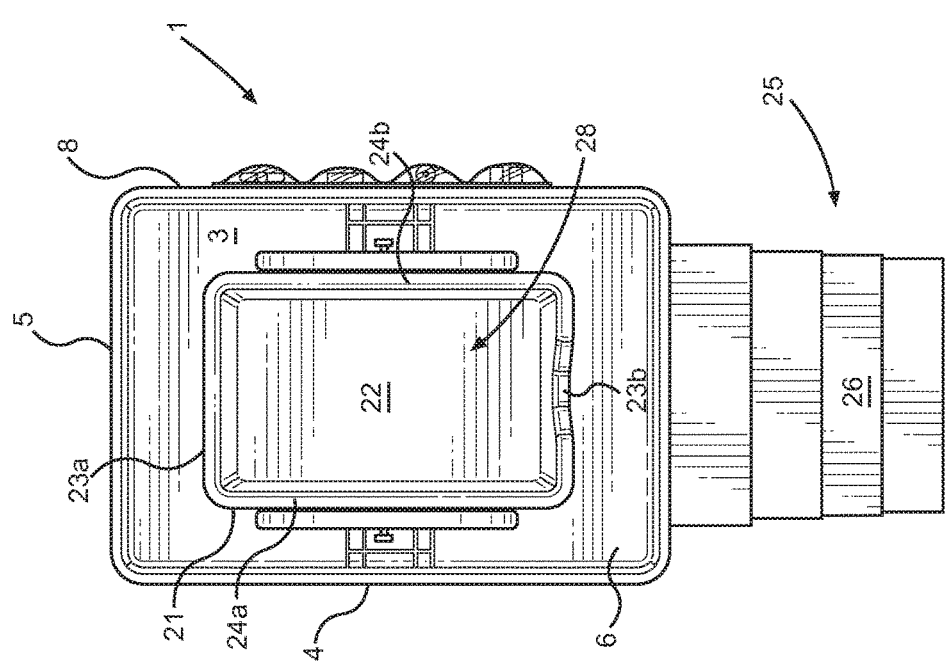
FIG. 5 is a top view illustrating the Cat Box Table according to an embodiment of the present invention of FIG. 1.
Figure 8:
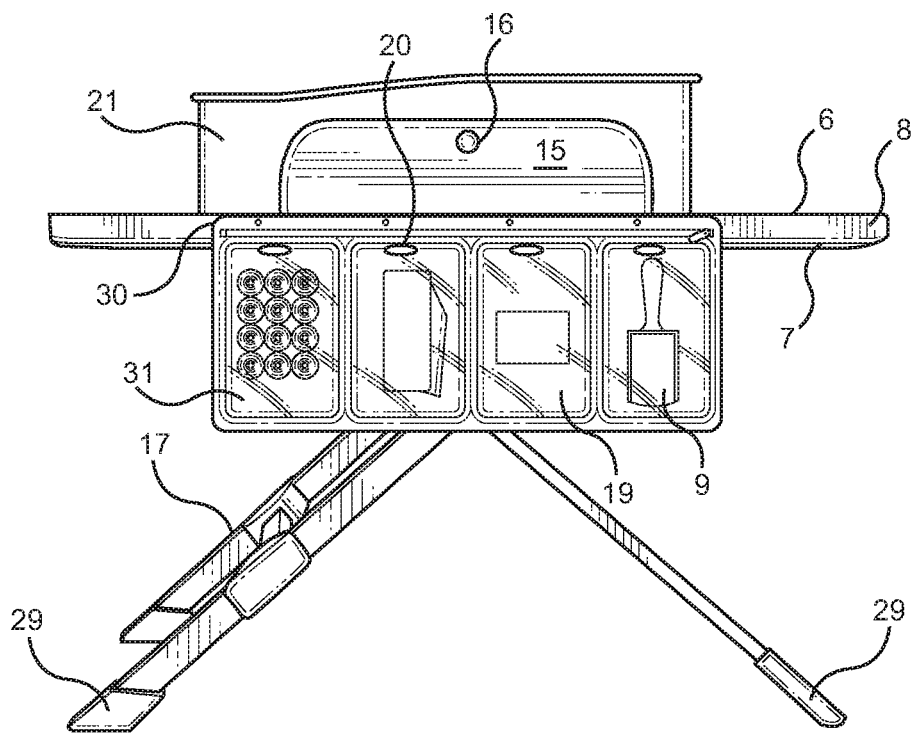
FIG. 8 is a side view illustrating the Cat Box Table according to an embodiment of the present invention of FIG. 1.

Referring to the drawings by numerals of reference there is shown in FIGS. 1-9, a litter box assembly 1 comprising a table 2 which includes a rigid platform 3 which is best illustrated in FIG. 5. The rigid platform 3 includes a length 4 and a width 5 perpendicular to the length 4. The length 4 is three feet. The width 5 is two feet. The table 2 also includes a top portion 6, a bottom portion 7, and at least one side edge portion 8. The at least one side edge portion 8 includes at least one suitable table connector 10 attached thereto as can best be seen in FIG. 2. The table connector 10 is adapted to mate with the accessory bag 18 as seen in FIG. 3. The side edge portion 8 is located between the top portion 6 and the bottom portion 7. At least one side edge portion 8 extends above the top portion 7 and is adapted to prevent material from falling off.

Figure 9:
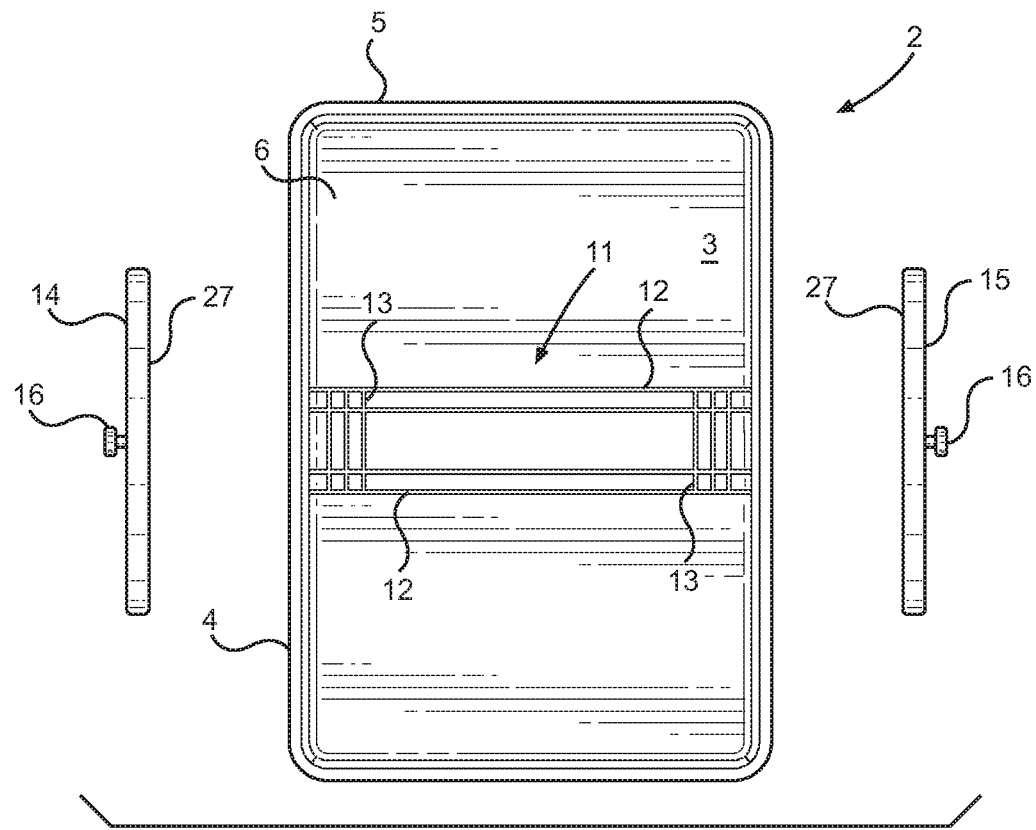
FIG. 9 is an exploded view illustrating the top of the Cat Box Table according to an embodiment of the present invention of FIG. 1.

The table 2 also has a track 11 which includes an elongated opening 12 which extends through the top and bottom portions 6 and 7 respectively and which extends along a substantial portion of the width 5 of the rigid platform 3 as can be best seen in FIG. 9. The track 11 also includes a series of spaced notches 13 which are located on an inner surface of the elongated opening 12.

The table 2 further includes a first wall 14 and a second wall 15 both of which are perpendicular to the top portion 6 and which extends along a portion of the length 4 of the rigid platform 3 as best seen in FIG. 9. The first wall 14 and second wall 15 each include a rubber pad 27 attached thereto. A connector portion 16 is adapted to extend through the elongated opening 12 of the track 11 and to selectively and releasably engage with a chosen one of the series of spaced notches 13 wherein at least the first wall 14 is movably attached perpendicularly to the top portion of the track 11 and oriented parallel to the second wall 15 such that a resulting space between the first and second walls 14 and 15 is created and is adjustable.

A plurality of legs 17a, 17b, 17c, and 17d, as best seen in FIG. 1 are formed from metal and are attached to the bottom portion 7 of the rigid platform 3 by conventional pivotal connectors not shown and are adapted to stably hold it in a horizontal orientation between 20 and 30 inches above a supporting surface when in use. The legs 17a, 17b, 17c, and 17d are formed from a plurality of pivotally connected leg members adapted such that they can be folded and stored. Each of the legs 17a, 17b, 17c, and 17d include a rubber member 29, as best seen in FIG. 3 at a respective end thereof to increase friction between each leg end and the supporting surface.

An accessory bag 18 which includes at least one pocket 19 is adapted to hold cleaning accessories 9 and has an accessory bag connector 20 which is adapted to releasably connect with a table connector 10 such that the accessory bag 18 is adapted to be removably attached to at least one side edge portion 8 of the table 2. At least one pocket 19 is releasably opened and closed by a zipper 30 and formed of a mesh material 31, as seen in FIG. 2. The table connector 10 is formed as a grommet but could also be formed as any suitable connector that will mate with the accessory bag 18. The accessory bag connector 20 is normally formed as a ring which is adapted to mate with the table connector 10 or to mate with a suitable connector not shown on the accessory bag 18 itself. A cleaning accessory 9 is adapted clean the litter box assembly 1 and is adapted to be releasably stored within the at least one pocket 19 of the accessory bag 18. The cleaning accessory 9 is chosen from a group of cleaning accessories consisting of a brush, a towel, a liquid cleaner, a disinfectant, a deodorizer, a litter liner and a litter scoop.

The litter box assembly 1 also includes a litter box 21 as best seen in FIG. 5 and is formed from plastic. The litter box 21 has a bottom panel 22 and two end panels 23a and 23b which are attached to and extend upwardly from the bottom panel 22. Two side panels 24a and 24b are also attached to and extend upwardly from the bottom panel 22. The bottom panel 22, end panels 23a, 23b and side panels 24a, 23b form an interior volume 28 which is adapted to removably hold cat litter.

The litter box 1 is adapted to be removably and stably held in place upon the top portion 6 of the table 2 between the first wall 14 and second wall 15 and held securely in place by the rubber pads 27 as best seen in FIG. 9 and is attached thereto when either first or second wall 14 and 15 respectively is adjusted by way of the track 11 and series of spaced notches 13.

Figure 7:
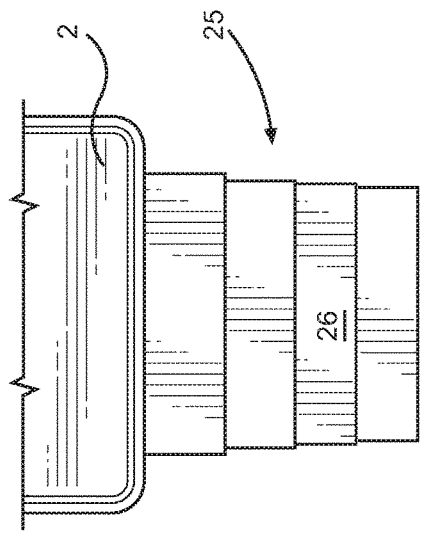
FIG. 7 is a top view illustrating the steps of the Cat Box Table according to an embodiment of the present invention of FIG. 1.

The litter box assembly 1 includes a step assembly 25 as seen in FIG. 7 which includes a plurality of steps 26 adapted to be connected to at least one side portion 8 of the rigid platform 3 and adapted to allow a cat to climb up and down from the table 2. The step assembly 25 is formed having a width of sixteen inches. The step assembly 25 and plurality of steps 26 are each formed having a height of five inches and a depth of five inches.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:
1. A litter box assembly comprising:
   a table including:
      a rigid platform including:
         a length;
         a width perpendicular to said length;
         a top portion; and
         a bottom portion;
         at least one side edge portion including:
            at least one table connector attached thereto;

wherein said at least one side edge portion is located between said top portion and bottom portion; and a track including:
an elongated opening;
wherein said elongated opening extends through said top and bottom portions and along a substantial portion of said width;
a series of spaced notches;
wherein said series of spaced notches are located on an inner surface of said elongated opening;

a first wall;
wherein said first wall is attached perpendicularly to said top portion and extends along a portion of said length of said rigid platform;

a second wall including:
a connector portion;
wherein said connector portion is adapted to extend through said elongated opening of said track and selectively and releasably engage with a chosen notch of said series of spaced notches;
wherein said second wall is movably attached perpendicularly to said top portion via said track, extends along a portion of said length of said rigid platform, and is oriented parallel to said first wall, such that a resulting space between said first wall and said second wall is adjustable; and a plurality of legs;
wherein said plurality of legs are attached to said bottom portion of said rigid platform and are adapted to stably hold said rigid platform in a horizontal orientation above a support surface;

an accessory bag including:
at least one pocket;
wherein said at least one pocket is adapted to releasably hold cleaning accessories therein; and
at least one accessory bag connector;
wherein said at least one accessory bag connector is attached thereto and is adapted to releasably connect with said at least one table connector, such that said accessory bag is adapted to be removably attached to said at least one side edge portion of said table; and a litter box including:
a bottom panel;
two end panels;
wherein said two end panels are spaced from one another and are attached to and extend perpendicularly upwards from said bottom panel; and
two side panels;
wherein said two side panels are spaced from one another, are attached to and extend perpendicularly upwards from said bottom panel, and extend between said two end panels;
wherein said bottom panel, said two end panels, and said two side panels form an interior volume;
wherein said litter box is adapted to removably hold cat litter within said interior volume; and
wherein said litter box is adapted to be removably and stably held in place upon said top portion of said table between said first wall and said second wall when said second wall is adjusted via said track and series of spaced notches.

2. The litter box assembly of claim 1, further comprising a step assembly including a plurality of steps; wherein said step assembly is adapted to be connected to said at least one side edge portion and adapted to allow a cat to climb up and down from said table via said plurality of steps.

3. The litter box assembly of claim 1, further comprising at least one cleaning accessory adapted to clean said litter box, and is adapted to be releasably stored within said at least one pocket of said accessory bag.

4. The litter box assembly of claim 3, wherein said at least one cleaning accessory is chosen from a group of cleaning accessories consisting of a brush, a towel, a liquid cleaner, a disinfectant, a deodorizer, a litter liner, and a litter scoop.

5. The litter box assembly of claim 1, wherein said first wall and said second wall each include rubber pad attached thereto adapted to respectively contact outer surfaces of said two side panels of said litter box, to thereby increase friction therebetween.

6. The litter box assembly of claim 1, wherein said at least one table connector is formed as a grommet; and said at least one accessory bag connector is formed as a ring.

7. The litter box assembly of claim 1, wherein said plurality of legs are formed from a plurality of pivotally connected leg members adapted such that said plurality of legs can be folded and stored in a folded configuration.

8. The litter box assembly of claim 1, wherein said plurality of legs each include a rubber member at respective distal ends thereof adapted to increase friction between each respective one of said plurality of legs and said supporting surface.

9. The litter box assembly of claim 1, wherein said table is adapted to be held between 20 inches and 30 inches above said support surface.

10. The litter box assembly of claim 1, wherein said table is formed wherein said length is 3 feet and said width is 2 feet.

11. The litter box assembly of claim 1, wherein said at least one side edge portion extends above said top portion of said rigid platform, and is adapted to prevent material from falling off said top portion.

12. The litter box assembly of claim 2, wherein said step assembly is formed having a width of approximately 16 inches.

13. The litter box assembly of claim 12, wherein said plurality of steps of said step assembly are each formed having a height of 5 inches and a depth of 5 inches.

14. The litter box assembly of claim 1, wherein each of said at least one pocket of said accessory bag is releasably opened and closed via a respective zipper.

15. The litter box assembly of claim 1, wherein each of said at least one pocket of said accessory bag is formed from a mesh material.

16. The litter box assembly of claim 1, wherein said litter box is formed from plastic; and wherein said plurality of legs are formed from metal.

\* \* \* \* \*